United States Patent Office 3,075,930
Patented Jan. 29, 1963

3,075,930
EXPANDED POLYURETHANE PLASTIC CONTAINING ZEIN AND PROCESS FOR PREPARING SAME
William D. Stewart, North Springfield, and Richard O. Thomas, Arlington, Va., assignors to Atlantic Research Corporation, Fairfax County, Va., a corporation of Virginia
No Drawing. Filed Aug. 10, 1960, Ser. No. 48,570
22 Claims. (Cl. 260—2.5)

This invention relates to expanded polyurethane plastics of superior, uniform cellular structure.

Foamed polyurethanes are well known in the plastics art. Such plastics are generally prepared by reacting an organic polyol or mixture of polyols with an organic polyisocyanate in the presence of a foaming agent, which gasifies the reacting mixture to form a cellular structure. This is one of the problem areas in successful foaming since the viscosity of the composition and the setting or polymerization reaction rate must be such as to entrap and hold the gas to form the desired cell structure. A number of materials, such as ethyl cellulose, polyvinyl chloride and the like, have been employed to stabilize the foam and to ensure the formation of uniformly sized cells. In many cases, however, they do not perform as well as is desired.

The object of this invention is to provide a new stabilizing agent which markedly improves the uniformity of cell structure of expanded polyurethane plastics.

Other objects and advantages of the invention will become obvious from the following detailed description.

We have discovered that zein, when employed as a component in a polyol-polyisocyanate reaction mixture along with a foaming agent acts as an exceedingly effective foam stabilizer to produce expanded polyurethane products of excellent, uniform cell structure. The zein also can be used advantageously to influence and control certain of the properties of the foamed polyurethane product. We have found, for example, that in some formulations, the compressive strength of the expanded plastic can be increased by increasing the concentration of the zein.

The zein is effective when used either in its purified or commercially available forms. It can be added to the reaction mixture in solid state or in solution in an organic solvent. One of the important advantages of the zein lies in the fact that it is soluble in organic polyol solvents, such as propylene glycol and polyethylene glycols, e.g. Carbowax 300 and Carbowax 400, which, in turn are soluble in the reaction mixture. This effects a uniform distribution of the zein throughout the reaction mixture, which contributes to its stabilizing efficacy. The polyol solvent also functions advantageously as a reacting component in the polyurethane-forming reaction.

The reason for the marked efficacy of zein as a polyurethane foam stabilizer is not altogether clear but we believe it to be due not only to the viscosity-increasing characteristics of the zein in the reaction mixture but also to its particular reactivity with the organic polyisocyanate. The zein, which is a protein obtained from corn, is a polyamide containing amido groups reactive with the isocyanate. The zein molecule, by virtue of its particular structure and the number and positioning of its reactive amido groups, apparently functions as a linking component in the polymerization reaction which improves cell-forming properties.

The zein is effective in a large variety of polyolpolyisocyanate reaction mixtures presently employed in the foamed polyurethane art.

Suitable organic polyols include, for example, glycerol, trimethylol propane, butylene glycol, polyalkylene glycols, such as polyethylene glycol, polypropylene glycol, and polybutylene glycol, polyhydroxy polyesters, such as the reaction products of a polyhydroxy alcohol, e.g. glycerol, ethylene glycol, propylene glycol, polyethylene glycol, and trimethylol propane, with a polycarboxylic acid or anhydride, e.g. adipic acid, succinic acid, malonic acid, sebacic acid, diethylether dicarboxylic acid, maleic anhydride, and phthalic anhydride; esters of hydroxy carboxylic acids, such as castor oil, and glyceryl monoricinoleate; polyhydroxy amino alcohols, such as N,N,N',-N'-tetrakis-(2-hydroxypropyl) ethylene diamine (Quadrol), triethanol amine; and the like.

Substantially any reactive organic polyisocyanate can be employed, including aliphatic diisocyanates, such as hexamethylene diisocyanate, and aromatic polyisocyanates, such as 2,4-tolylene diisocyanate, mixtures of 2,4-tolylene diisocyanate and 2,6-tolylene diisocyanate, m-phenylene diisocyanate, 3,3'-bitolylene-4,4'-diisocyanate, diphenylmethane-4,4'-diisocyanate, dianisidine diisocyanate, 1,5-naphthalene diisocyanate, tri-(p-isocyanylphenyl) methane, the triisocyanate adduct formed by reaction of 1 mol of hexanetriol and 3 mols of m-tolylene diisocyanate, and the like. The particular polyisocyanate selected is generally determined to a considerable extent by its reaction rate in a given reaction system and the properties which it imparts to the final polymer product. In a highly reactive system, the use of a somewhat less reactive aliphatic diisocyanate, such as hexamethylene diisocyanate can be advantageous to prevent excessive exotherm or to prevent excessive hardening of the polymeric structure before good cell formation is obtained. In general, the aromatic diisocyanates are preferred because of their more rapid reaction rates, and, in particular, 2,4- or a mixture of 2,4- and 2,6-tolylene diisocyanate, because of its excellent performance, availability and low cost.

The rate of reaction of a relatively slowly reactive polyol, such as castor oil or a polyester, with the polyisocyanate can be increased in accordance with conventional practice by means of a catalyst, such as an amine, preferably a tertiary amine, e.g. N-methyl morpholine, triethylene diamine, or triethyl amine, or metal salts, e.g. iron acetyl acetonate, lead naphthenate, cobalt naphthenate, zinc stearate, tributyl tin methacrylate, dibutyl tin dilaurate, dibutyl tin oxide, sodium stearate, sodium ricinoleate, sodium salicylate, sodium citrate, or the like. Although, in general such catalysis is a function of basicity of the reaction mixture, with inorganic acids acting as inhibitors, Lewis acids, such as trimethyl boron, have catalytic activity. Where a highly reactive polyol, particularly a basic polyol, such as Quadrol or triethanol amine, is included in the reaction mixture, a catalyst can generally be dispensed with.

Any conventional foaming agent can be employed. Water, which reacts with the polyisocyanate to form $CO_2$ is generally preferred because of its low cost and ease of use. A carboxylic acid, preferably of low molecular weight, such as acetic acid, propionic acid, lactic acid, or β-hydroxy propionic acid, can also be used for its $CO_2$ forming reaction with the polyisocyanate. Other suitable foaming agents include inert gases, such as nitrogen or $CO_2$ injected into the reaction mixture under pressure, low-boiling, non-solvent, volatile compounds, such as the Freons, e.g. trichloromonofluoromethane, dichlorodifluoromethane, dichlorotetrafluoroethane, and the like, and compounds which are decomposed by the heat produced by the exothermic polymerization reaction to form expanding gases, such as azo bis-isobutyronitrile, diazoaminobenzene, 1,1'- azo-bis-(formamide), N,N'-dinitrosopentamethylene tetramine, N,N'-dimethyl-N,N'-dinitroso terephthalamide, benzene sulfonyl hydrazide, ammonium and sodium carbonate and bicarbonate, and the like.

When water is employed as the foaming agent, it is generally desirable to follow the conventional practice of including an emulsifier as a dispersing and stabilizing agent since water and most polyisocyanates are relatively immiscible and may, therefore, react too slowly. The emulsifier can be dispensed with if other components, such as a basic polyol, also possess surface-active characteristics. Any suitable surface active agent can be employed, such as polyoxyethylated vegetable oils, polyglycol esters of fatty acids, polyglycol aryl and higher fatty alcohol ethers, alkyl aryl sulfonates, dialkyl sulfo-succinates, petroleum sulfonates, higher fatty acid soaps and sulfated fatty acid soaps, etc.

Finely-divided pigments and fillers, such as calcium carbonate, calcium sulfate, calcium oxide, aluminum, aluminum oxide, carbon black, and the like, can also be incorporated if desired for special applications.

The preparation of the polyurethane foam can be carried out in a "one shot" operation, or in a two step procedure employing a prepolymer formed by reaction of the polyol and polyisocyanate in which one or the other of these two components is used in excess so that the resulting polymer contains either reactive isocyanate groups or reactive hydroxy groups. The foamed polyurethane is then made by addition of a polyol or polyisocyanate, depending in the reactive groups present in the prepolymer, together with the foaming agent, catalyst, and such other additives as may be desired.

The amounts of the various components used will, of course, vary considerably, depending upon such factors as the reactivity of the specific reagents and the particular physical characteristics desired in the cured foam, such as density, degree of flexibility or rigidity, compressive strength, and the like.

We have found the zein to be particularly effective as a stabilizing agent in rapidly-foaming reaction mixtures of high exotherm. Such highly reactive compositions are obtained, for example, by employing a polyol of relatively low equivalent weight in terms of its functional hydroxy groups, either as the sole polyol or in admixture with a high molecular weight polyol of lesser reactivity, such as castor oil, a polyester, or a long chain polyglycol.

Such highly reactive polyols can be employed not only to increase the reaction rate of a high molecular weight polyol but also to induce thermal polymerization of an ethylenically-unsaturated non-polyol monomer component to produce foamed-in-place rigid foams of high strength and energy-absorptivity. Illustrative compositions comprise the condensation product of a polyhydroxy ester of ricinoleic acid containing at least two ricinoleyl groups and having an equivalent weight in terms of its hydroxy functionality of above 200, such as castor oil; a second, highly reactive polyol containing at least 3 functional hydroxy groups and having a maximum equivalent weight in terms of its hydroxy functionality of about 125, such as Quadrol, glycerol, or triethanol amine, an organic polyisocyanate; a polymerizable, ethylenically-unsaturated monomer containing at most one hydroxy group, such as a vinyl compound; and a foaming agent. Illustrative examples of suitable polymerizable, ethylenically-unsaturated, non-polyol monomers include: styrene, vinyl toluene, ethyl acrylate, butyl acrylate, 2-ethyl-hexyl acrylate, methyl methacrylate, ethyl methacrylate, diethylene glycol dimethacrylate, tetraethylene glycol dimethacrylate, dialyl succinate, dimethyl maleate, diallyl maleate, vinyl acetate, vinyl stearate, diallyl phthalate, methyl butenol, divinyl benzene, triallyl cyanurate, N,N'-diallyl melamine, and the like. The polyricinoleate preferably comprises at least about 10% by weight of the composition, the highly reactive polyol at least about 10% by weight of the polyricinoleate, and the ethylenically-unsaturated monomer at least about 5% by weight of the polyricinoleate. Compositions of this type foam in place almost instantaneously. The addition of zein to such rapidly reacting foaming mixes results in a cell structure of excellent uniformity.

*Example 1*

The following components were mixed at room temperature:

| | Grams |
|---|---|
| Quadrol | 60 |
| Castor oil | 40 |
| Diallyl phthalate | 20 |
| Zein [1] dissolved in propylene glycol (14% zein by weight) | 15 |
| Emulsifier comprising sulfonated petroleum oils | 4 |
| Tolylene diisocyanate | 86 |

[1] Water for foaming present in zein.

Foaming began within seconds with maximum rise completed in about one minute. The expanded polyurethane product was a rigid foam of good, uniform cell structure and good compressive strength. Increasing the concentration of zein in the above formulation was found to produce an increase in compressive strength.

*Example 2*

The following components were mixed at room temperature:

| | Grams |
|---|---|
| Castor oil | 130 |
| Glyceryl monoricinoleate | 6 |
| Triethylene diamine | 5 |
| Zein | 10 |
| Emulsifier comprising polyoxyethylated vegetable oil | 0.4 |
| Silicone oil | 0.5 |
| Water | 0.25 |
| Tolylene diisocyanate | 51 |

Foaming occurred within seconds to produce a flexible expanded polyurethane of good, small, uniform cell structure.

*Example 3*

The following components were mixed at room temperature:

| | Grams |
|---|---|
| Quadrol | 20 |
| Castor oil | 20 |
| Zein | 3 |
| Water | 0.25 |
| Emulsifier comprising polyoxyethylated vegetable oil | 0.2 |
| Tolylene diisocyanate | 30.5 |

The foamed polyurethane product was rigid and possessed excellent, uniform cell structure.

*Example 4*

The following components were mixed at room temperature:

| | Grams |
|---|---|
| Quadrol | 35 |
| Castor oil | 20 |
| Styrene | 10 |
| Zein | 15 |
| Emulsifier comprising sulfonated petroleum oils | 4 |
| Silicone oil | 0.08 |
| Water | 1 |
| Tolylene diisocyanate | 90 |

The mixture foamed rapidly to give a product of good uniform cell structure having a density of 1.55 lb./cu. ft. Variations of the above recipe by inclusion of 2 grams of water produced a uniformly celled product having a density of 0.94 lb./cu. ft.

It should be noted that it is ordinarily very difficult to produce very low density foams such as these, having good, uniform cell structure. The cells normally tend to be irregular and non-uniform in character. The zein foam stabilizer is, therefore, particularly effective in this area.

*Example 5*

A recipe similar to that in Example 4, except for substitution of 0.2 gram of an emulsifier comprising polyoxyethylated vegetable oil, omission of the silicone oil and an increase in the amount of tolylene diisocyanate to 93 g. Density of the rigid foamed product was 1.69 lb./cu. ft. and the cell structure was small and uniform.

*Example 6*

The following components were mixed at room temperature:

| | Grams |
|---|---|
| Quadrol | 60 |
| Styrene | 20 |
| Zein | 3 |
| Tolylene diisocyanate | 74 |

Foaming was immediate. The expanded polyurethane was rigid and of good uniform cell structure.

*Example 7*

The following components were mixed at room temperature:

| | Grams |
|---|---|
| Quadrol | 60 |
| Castor oil | 40 |
| Diallyl phthalate | 20 |
| Zein | 3 |
| Water | 2 |
| Polymethylene polyphenyl polyisocyanate (tri)[1] | 71 |

[1] PAPI—The Carwin Co.

The foamed rigid product has good, small, uniform cell structure.

*Example 8*

The following components were combined:

| | Grams |
|---|---|
| Polyol polyester[1] | 100 |
| Water | 4 |
| Zein | 10 |
| N-methyl morpholine | 1 |
| Emulsifier comprising sulfonated petroleum oils | 4 |
| PAPI | 160 |

[1] PFR-6—National Aniline Div. of Allied Chemical & Dye Corporation.

The foamed product was substantially rigid and had excellent, small, uniform cell structure.

*Example 9*

The following components were combined at ordinary temperature:

| | Grams |
|---|---|
| Polypropylene glycol[1] having polyethylene glycol end groups | 70 |
| Glyceryl monoricinoleate | 7.5 |
| Zein | 3 |
| Tolylene diisocyanate | 51 |

[1] Pluronic L-62—Wyandotte Chemicals.

A flexible, even, uniform foam having excellent low and high temperature properties was obtained. Flexibility was retained at temperatures as low as −27° C. and 100° F.

Although this invention has been described with reference to illustrative embodiments thereof, it will be apparent to those skilled in the art that the principles of this invention can be embodied in other forms but within the scope of the claims.

We claim:

1. A foamed polyurethane composition essentially comprising the reaction product of an organic polyol and an organic polyisocyanate, in admixture with a foaming agent and a stabilizing agent, said stabilizing agent being zein in an amount sufficient to stabilize the foamed composition.

2. The composition of claim 1 in which said stabilizing agent is a solution of said zein in an organic polyol solvent.

3. The composition of claim 2 in which the organic polyol solvent is propylene glycol.

4. The composition of claim 1 in which the organic polyisocyanate is an arylene polyisocyanate.

5. The composition of claim 4 in which the polyisocyanate is tolylene diisocyanate.

6. The composition of claim 4 in which the organic polyol is a polyol polyester.

7. A foamed polyurethane composition comprising the reaction product of a polyhydroxy alcohol ester of ricinoleic acid containing at least two ricinoleyl groups and having an equivalent weight in terms of its functional hydroxy groups above 200; a second polyol containing at least three functional alcoholic hydroxy groups and having a maximum equivalent weight in terms of its functional hydroxy groups of about 125; an organic polyisocyanate; and a polymerizable, ethylenically-unsaturated monomer having at most one functional hydroxy group; in admixture with a foaming agent and a stabilizing agent, said stabilizing agent being zein in an amount sufficient to stabilize the foamed composition.

8. The composition of claim 7 in which the polyhydroxy alcohol ester of ricinoleic acid is castor oil.

9. The composition of claim 8 in which the organic polyisocyanate is an aromatic polyisocyanate and the ethylenically-unsaturated monomer is a vinyl compound.

10. The composition of claim 9 in which the vinyl compound is styrene.

11. The composition of claim 4 in which the organic polyol is a polyglycol.

12. A process for making a foamed polyurethane composition comprising reacting organic polyol with an organic polyisocyanate in the presence of a foaming agent and a stabilizing agent, said stabilizing agent being zein in an amount sufficient to stabilize the foamed composition.

13. The process of claim 12 in which said zein is dissolved in an organic polyol solvent.

14. The process of claim 13 in which the organic polyol solvent is propylene glycol.

15. The process of claim 12 in which the organic polyisocyanate is an arylene polyisocyanate.

16. The process of claim 15 in which the polyisocyanate is tolylene diisocyanate.

17. The process of claim 15 in which the organic polyol is a polyol polyester.

18. The process of claim 15 in which the organic polyol is a polyglycol.

19. A process for making a foamed polyurethane composition comprising admixing a polyhydroxy alcohol ester of ricinoleic acid containing at least two ricinoleyl groups and having an equivalent weight in terms of its functional hydroxy groups above 200; a second polyol containing at least three functional alcoholic hydroxy groups and having a maximum equivalent weight in terms of its functional hydroxy groups of about 125; an organic polyisocyanate; and a polymerizable, ethylenically-unsaturated monomer having at most one functional hydroxy group; in the presence of a foaming agent and a stabilizing agent, said stabilizing agent being zein in amount sufficient to stabilize the foamed composition.

20. The process of claim 19 in which the polyhydroxy alcohol ester of ricinoleic acid is castor oil.

21. The process of claim 20 in which the organic polyisocyanate is an aromatic polyisocyanate and the ethylenically-unsaturated monomer is a vinyl compound.

22. The process of claim 21 in which the vinyl compound is styrene.

(References on following page)

References Cited in the file of this patent

UNITED STATES PATENTS

| | | |
|---|---|---|
| 2,185,123 | Coleman | Dec. 26, 1939 |
| 2,515,276 | Swift | July 18, 1950 |
| 2,772,245 | Simon et al. | Nov. 27, 1956 |
| 2,787,601 | Detrick et al. | Apr. 2, 1957 |
| 2,798,054 | Simon et al. | July 2, 1957 |

OTHER REFERENCES

Ferrari et al.: "Ind. and Eng. Chem.," volume 50, No. 7, July 1958, pages 1041–1044.